ETHYLENE DICHLORIDE ETCHED
STRETCHED BY METHOD OF PRESENT INVENTION

ETHYLENE DICHLORIDE ETCHED
STRETCHED BY PRIOR ART METHOD

IODINE ETCHED
STRETCHED BY PRIOR ART METHOD

INVENTOR.
TERRY D. FORTIN
BY Fulwider, Patton, Rieber
Lee, and Utecht
ATTORNEYS

United States Patent Office 3,632,841
Patented Jan. 4, 1972

3,632,841
METHOD OF STRETCHING ACRYLIC PLASTICS AND PRODUCT
Terry D. Fortin, 8427 Etiwanda Ave., Northridge, Calif. 91324
Continuation of application Ser. No. 691,294, Dec. 18, 1967. This application May 13, 1970, Ser. No. 37,430
Int. Cl. B29d 11/00
U.S. Cl. 264—1
19 Claims

ABSTRACT OF THE DISCLOSURE

A method for stretching of as-cast acrylic plastics to produce stretched acrylics having superior optical and physical properties, comprising compressing an acrylic plastic blank, preheated substantially isothermally to its softening temperature range, between a pair of curved or flat polished elements or plates having a film of lubricant coated thereon at a predetermined thickness-reduction rate until the desired acrylic sheet thickness is reached and, thereafter, cooling the stretched acrylic sheet at a predetermined rate to a temperature below its softening temperature range prior to removing the pressure from the acrylic materials.

This application is a division of application S.N. 691,294, filed Dec. 18, 1967 and now abandoned.

BACKGROUND OF THE INVENTION

This invention relates to stretching and polishing of acrylic materials.

Because of their strength, weatherability and light transmittance characteristics, acrylics (including both "pure" and "modified" acrylics) have been widely used as optical parts, for example, as aircraft windows and canopies and as display panels. Production of, for example, aircraft acrylic parts, requires that acrylic blanks be stretched to improve the physical properties of the acrylic part. At present, stretching is generally accomplished by pulling techniques such as that described in U.S. Patent No. Re. 24,978, issued May 2, 1961, to P. H. Bottoms et al. Briefly, these methods require preheating of the part in an oven, transporting the heated part to a stretching apparatus, attaching numerous gripping means to the outer edges of the part as fast as possible to reduce cooling of the part and, thereafter, operating the stretching apparatus to stretch the part. Such methods are expensive because they require complex equipment and the use of several persons who must act in concert to stretch the part and because substantial amounts of material are lost around the edges of the part where the gripping means are attached to the part. Additionally, such methods are generally not capable of producing close thickness tolerance sheets and, therefore, the stretched sheet must be ground and polished to provide the required close tolerances.

Present stretching techniques do not result in surfaces free of markings, therefore, markings present in parts which have been stretched by presently known methods must be removed by additional polishing steps.

Attempts have been made to produce stretched acrylic sheets by hot pressing as-cast acrylic blanks between polished plates. However, the stretched acrylic sheets produced by this method have not had uniform optical and physical properties because the flow of acrylic material between the polished plates is not uniform. To the best of the inventor's knowledge, such method has been abandoned, because of the poor stretched acrylic sheets produced, in favor of stretching by pulling as described in the previously referred-to Bottoms et al. patent.

SUMMARY OF THE INVENTION

This invention for compression stretching acrylics comprises compressing an as-cast acrylic plastic blank, heated to its softening temperature range, between a pair of curved or flat polished plates having a thin film of lubricant coated thereon, at predetermined thickness-reduction rates until the desired thickness is obtained and, thereafter, cooling the stretched part to a temperature below its softening temperature range, at predetermined cooling rates, before releasing the pressure on the stretched sheet. The use of lubricant between the acrylic blank and polished plates ensures stretched sheets having uniform optical and physical properties.

The method of this invention is superior to the prior art stretching methods in several respects. Relatively little material is lost from the edges of the stretched sheet. Labor costs are decreased because one person can perform the herein-described stretching operation. Part rejection due to cracking and/or warping is substantially eliminated because closer control of the temperature of the acrylic material is possible. Thickness tolerances can be controlled much more closely than is possible using presently known stretching methods. The stretched acrylic sheets produced by this method have superior optical properties because of the polishing provided by the polished plates and because of the close control of the temperature of the acrylic material. The stretched sheets also have superior abrasion and solvent resistance because of the compacting of the acrylic molecules due to compression of the acrylic blanks.

DESCRIPTION OF THE PREFERRED EMBODIMENT

In general, the compression stretching method of this invention comprises: heating an as-cast acrylic blank to a temperature sufficient to soften or plasticize the particular acrylic material; compressing the heated acrylic blank between a pair of polished plates or cauls having a thin film of lubricant coated thereon at a pressure which produces a predetermined rate of thickness reduction of the acrylic blank until a desired final thickness of the stretched acrylic sheet has been reached; and cooling the stretched acrylic sheet at a particular cooling rate until the temperature of the stretched acrylic sheet has been reduced below that temperature above which the particular acrylic softens.

As used therein, the term "acrylic" refers to polymerization products of acrylic acid, and includes both modified and unmodified acrylics. Especially useful are the modified polymerization products of methyl methacrylate such as Plexiglas® II and Plexiglas® 55, manufactured by Rohm and Haas. The term "minimum softening temperature" refers to a temperature which varies with the particular acrylic material, above which the acrylic material flows appreciably, that is, exhibits measurable flow. Below the minimum softening temperature, the modules of elasticity of the acrylic material, in either stretched or unstretched condition, increases rapidly with decreasing temperature making the acrylic material substantially less "stretchable" below the minimum softening temperature than it is above this temperature.

Figure 1:
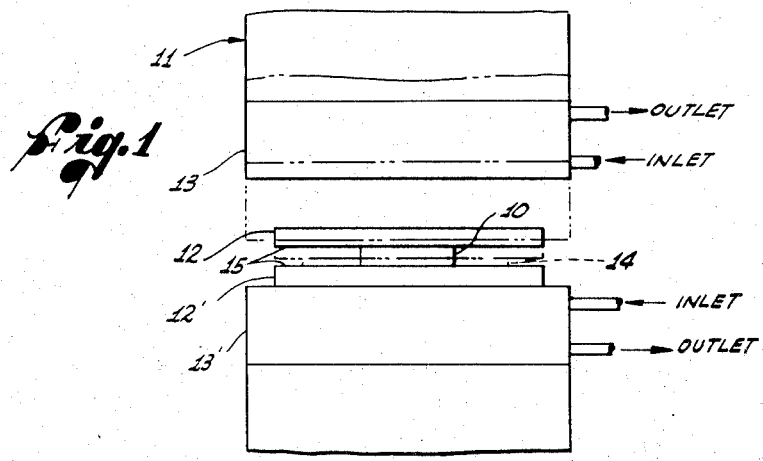
FIG. 1 is a front elevational view of the press having positioned therein an acrylic blank sandwiched between a pair of polished plates.

More specifically, and with reference to FIG. 1, the initial step comprises heating an as-cast acrylic blank 10 up to a temperature above the minimum softening temperature. As previously stated, this temperature will vary with the particular acrylic being compression stretched. For example, the minimum softening temperatures of Plexiglas 55 and Plexiglas II are about 270° F. and about 250° F., respectively. The acrylic material is preferably heated somewhat above the minimum softening temperature. For example, it is preferable to heat Plexiglas 55 and Plexiglas II to temperatures of about 280–300° F. and 250–290° F., respectively.

There is, however, an upper temperature above which it is undesirable to heat the acrylic blank 10. Above this upper temperature, the acrylic material flows too much at the pressures employed herein with the result that severe cracking of the stretched sheets takes place. This upper temperature limit also varies somewhat depending upon the particular acrylic being used. For example, for Plexiglas 55 this upper temperature is about 330° F. The temperature range between the minimum softening temperature and this upper temperature limit will hereinafter be designated by the term "softening temperature range," and this range for present acrylics lies between about 250° F. and about 330° F.

The acrylic blank 10 is heated for a time sufficient to raise the temperature of the entire blank up to a substantially uniform temperature within the softening temperature range. Heating the acrylic blank 10 to a substantially isothermal condition ensures substantially uniform flow of the acrylic material during the compression step. Such heating time will depend upon the mass of the acrylic blank 10. For example, for a 6 in. x 4 in. x 0.5 in. Plexiglas 55 blank, about thirty minutes are required to bring the blank temperature to about 300° F.

The heated acrylic blank is next compression stretched in, for example, a press 11 between a pair of polished plates or cauls 12, 12'. The polished plates 12, 12' are made from materials having a low coefficient of friction and may be metal, for example, steel and aluminum, or glass, for example, Parallel-O-Plate® (Libby Owens Ford). The polished plates 12, 12' may be curved or flat.

A thin film of lubricant 15 is used between the acrylic blank 10 and the polished plates 12, 12'. This lubricant film may be coated on the surfaces of the acrylic blank 10 in contact with the polished plates 12, 12' or it may be coated on the surfaces of the polished plates in contact with the acrylic blank. In either case, the lubricant film 15 promotes substantially uniform flow of the acrylic material between the polished plates 12, 12' with the result that the stretched sheets of this invention exhibit substantially improved optical, physical and mechanical properties as compared with stretched sheets produced by prior art stretching techniques.

Ideally, a monomolecular layer of lubricant would be preferred. However, lubricant films of thickness less than about 0.0005 in., depending upon the particular lubricant, have proved satisfactory. Substantially greater thicknesses of lubricant film tend to mark the surface of the stretched acrylic sheet. Preferably, the lubricant is polytetrafluoroethylene, for example, which is commercially available in colloidal dispersion as Mold-Wiz® F-57 (Axel Plastics Research Lab. Inc.). Various petroleum-based greases, for example, Richfield R557 and various silicone lubricants, for example, General Electric silicone emulsion SM2050 may also be used.

During the compression stretching step, the acrylic blank 10 is maintained at substantially the same temperature to which it was heated during the initial heating step. This is accomplished by also heating the press platens 13, 13' and polished plates 12, 12' to substantially the same temperature as the acrylic blank 10. Preferably, the unheated acrylic blank 10 is placed between the polished plates 12, 12' and the resulting acrylic sandwich 10, 12, 12' is heated to a temperature within the softening temperature range. The acrylic sandwich 10, 12, 12' may be heated in an oven to the desired temperature and then transferred to a preheated press or, the aforementioned sandwich may be placed in a press and heated together with the press platens to the desired temperature.

With the heated acrylic sandwich 10, 12, 12' in the heated press, pressure is applied to the sandwich through the press platens 13, 13' to cause the acrylic blank to decrease in thickness and, simultaneously, to expand or flow outwardly. The size of the unstretched acrylic blank is such that its thickness is greater than the thickness of the stretched acrylic sheet and such that reduction of its initial thickness to the desired thickness of the stretched sheet is accomplished by expansion of its length and width to provide a surface area at least as large as desired for the stretched acrylic sheet. Any increment in surface area over that of the desired stretched sheet can be removed by conventional machining techniques.

As described, simultaneously with the decrease in thickness of the acrylic blank 10, the blank expands outwardly between the polished plates. The amount of expansion or displacement under the same pressure and temperature conditions varies with the particular acrylic. As used herein, the term "displacement" refers to the increase in length or width, respectively. Plexiglas II can be displaced or stretched 100% while retaining good physical property values. Plexiglas 55 can be stretched 60% to 70% while maintaining good physical characteristics.

The pressure is increased to maintain the required thickness reduction rate until the thickness of the acrylic blank 10 has been reduced to the desired thickness. A stretched acrylic sheet is shown in dotted outline in FIG. 1 and is designated by the numeral 14. The method of this invention permits extremely accurate thickness control. The thickness of an acrylic blank can be reduced to within 1% to 2% of the desired thickness. This is to be compared with presently-used stretching methods which produce final thicknesses within only about 7% of the desired thickness and therefore, require grinding and polishing steps—steps which need not be employed following the compression stretching method of this invention.

The pressure applied to the acrylic blank 10 is determined by the rate of thickness reduction of the acrylic blank. The latter rate must be maintained within a specific range which produces substantially uniform flow of the acrylic plastic to thereby prevent cracking and deformation of the acrylic part as it is being stretched. The rate of thickness reduction is primarily dependent upon the rate of lateral flow of the acrylic plastic away from the center of the acrylic blank. The lateral rate of flow of the acrylic material may vary from about 0.10 in. to about 72 in. per minute and preferably varies from about 5 in./minute to about 10 in./minute. In general, the higher the temperature to which the acrylic plastic is heated, the faster can be the thickness reduction rate.

If the thickness reduction rate is too high, the acrylic blank will crack, presumably because insufficient time exists for the acrylic plastic to flow uniformly. The resulting uneven flow apparently sets up stresses which produce cracks in the stretched sheet. If the thickness reduction rate is too low, the acrylic material remains too long in a plastic or flowable state and this also results in cracking of the sheet. Within the aforementioned lateral flow rate range, the acrylic plastic flows substantially evenly outwardly from the center of the blank and cracking is eliminated. Such uniform flow provides the stretched acrylic sheet with substantially uniform physical, mechanical and optical properties.

To provide the above-mentioned thickness reduction rates, pressures on the order of about 300 p.s.i. to about 600 p.s.i. are used. Using Plexiglas 55 having an initial thickness of about 0.5 inch, satisfactory results are produced at compression pressures of about 500 p.s.i.

After the acrylic blank has been reduced in thickness to the desired thickness, the stretched acrylic sheet 14 is cooled while still in the press 11 and while subjected to a pressure just sufficient to maintain the desired thickness. If pressure is not maintained until the acrylic plastic is cooled below the minimum softening point, the material tends to return to its initial unstretched state. The cooling rate, during the time required to reduce the temperature of the acrylic sheet to a temperature below the minimum softening temperature of the acrylic plastic, varies from about 1° F./minute to about 20° F./minute and is preferably between about 3° F. and about 14° F./minute. This cooling rate range appears to be independent of both the thickness of the acrylic sheet and of the initial temperature of the acrylic sheet. Too rapid cooling (above the maximum cooling rate) is accompanied by a decrease in mechanical properties and by warpage. Too slow cooling (below the minimum cooling rate) may produce cracking and/or a decrease in physical properties.

The stretched acrylic sheet is cooled at a rate within the foregoing cooling rate range down to a temperature below the minimum softening temperature of the particular acrylic plastic and may be cooled substantially below that temperature to, for example, ambient temperature to further ensure that the plastic sheet is not affected by "plastic memory." However, it will be understood that at temperatures below the minimum softening temperature of a particular acrylic plastic, the rate of cooling becomes less critical and does not have to lie within the foregoing cooling rate range.

Cooling is preferably accomplished by circulating cooling water through the press platens 13, 13' until the temperature of the acrylic sheet 14 has been reduced below the minimum softening temperature. Further cooling may be accomplished by leaving the stretched acrylic sheet 14 in the press 11 or by removing the acrylic sheet from the press to ambient air.

After the stretched acrylic part 14 is removed from the press, it may be machined and/or formed, if necessary, to the required size and shape.

The following examples further illustrate this invention.

EXAMPLE I

One side of each of a pair of polished glass plates was coated with polytetrafluoroethylene lubricant (Mold-Wiz) by brushing the lubricant on and, thereafter, rubbing the excess lubricant off leaving an extremely thin film. An as-cast acrylic blank (Plexiglas 55) 4 in. x 6 in. x 0.5 in. was placed between these polished plates with the lubricant films contacting the acrylic blank to form an acrylic sandwich.

The acrylic sandwich was heated in an oven to 300° F. and then removed to a press in which the platens had been heated to 340° F. The acrylic blank was subjected to a total pressure of 6 tons (500 p.s.i.) for about 1 minute after which time the blank was reduced in thickness to 0.275 in. The stretched part was cooled to below 150° F. in about 15 minutes by circulating water through the press platens after the heating elements in the platens had been turned off.

The stretched part was approximately 5.5 in. x 7.75 in. x 0.275 in. It had a substantially mark-free surface. Objects viewed through the stretched part were substantially undistorted.

EXAMPLE II

An as-cast Plexiglas 55 blank was compression stretched by the method of this invention, using polished glass plates and Mold-Wiz F-57, at a temperature of about 290 F. and at a pressure of about 400 p.s.i. The Plexiglas 55 blank which had initial dimensions of 12" x 12" x .620" was compressed at a lateral flow rate of about 4.5 in./minute and was thereafter cooled at a rate of 4° F./second. The final dimensions of the stretched acrylic sheet were 21" x 21" x .208". This Plexiglas 55 sheet was designated as "stretched sheet A."

For comparison purposes, a stretched Plexiglas 55 sheet was employed which had been stretched in a manner similar to that described in the aforementioned U.S. Pat. No. Re. 24,978. This Plexiglas 55 sheet was designated as "stretched sheet B."

Figure 2A:
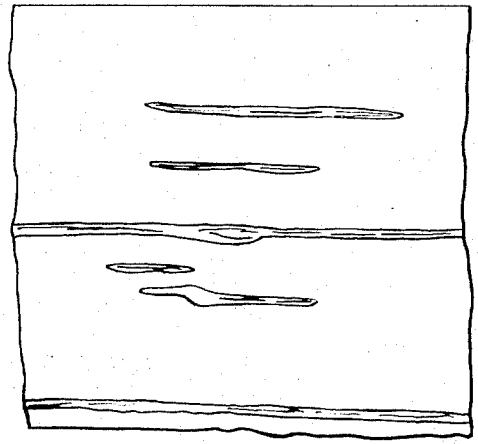
FIG. 2a is a pictorial representation of the effects of ethylene dichloride on an acrylic test sheet compression stretched by the method of this invention.
Figure 2B:
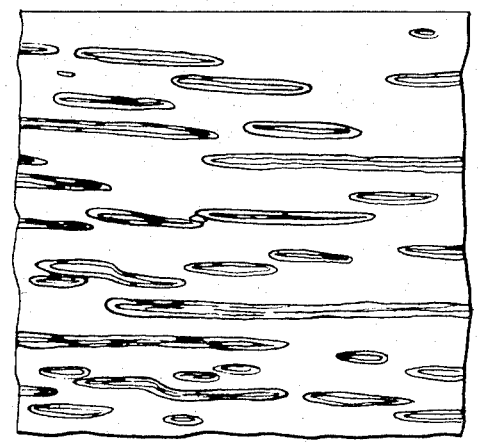
FIG. 2b is a pictorial representation of the effects of ethylene dichloride on an acrylic sheet (same acrylic as FIG. 2a) stretched by a frequently-employed prior art method.

Test specimens of each of the stretched Plexiglas 55 sheets A and B were separately etched with iodine and with ethylene dichloride for identical lengths of time. The pictorial results (magnified 100 times) are shown in FIGS. 2a and 2b for the ethylene dichloride test and are partially shown in the iodine test in FIG. 3. No picture of the effects of iodine on Plexiglas 55 stretched by the present method is shown because, using the same magnification as FIG. 3, no etching was visible at this magnification.

Figure 3:
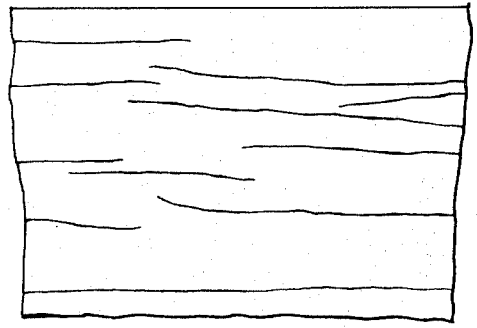
FIG. 3 is a pictorial representation of the effects of iodine on an acrylic sheet stretched by a frequently employed prior art method.

As will be seen from FIGS. 2a, 2b and 3, the Plexiglas 55 which was stretched by the method of this invention is much more resistant to solvent attack than is the Plexiglass 55 stretched by presently employed methods. The superior solvent resistance of the acrylics stretched by the method of this invention is believed due to the increased proximity of the molecules of the material stretched by the herein-described method. This is to be compared with the apparent separation of the molecules of the stretched acrylics which have been stretched by presently employed methods.

EXAMPLE III

A 2 ft. x 2 ft. x ½ in. polished glass plate (Parallel-O-Plate) was coated with Mold-Wiz F-57 lubricating agent. A 12 in. x 12 in. x 0.750 in. as-cast blank of modified acrylic plastic (Plexiglas 55) was placed between the polished plates such that the lubricating agent was sandwiched between the glass plates and the acrylic blank. Care was taken to eliminate the entrapment of any foreign particles between the glass plates and the acrylic surface.

The glass plate-acrylic blank sandwich was placed between electrically heated platens which were preheated to a temperature of 285° F. A pressure of 5 p.s.i. was applied over the surface of the acrylic blank and this pressure was maintained for 40 minutes while the platens were held at a temperature of 285° F. At the end of this time, the acrylic blank had been substantially isothermally heated to a temperature of 285° F. At the end of the 40 minute period, pressure on the acrylic blank was increased to 400 p.s.i. This increased pressure produced a displacement or lateral flow of the acrylic material outwardly between the glass plates. As the surface area of the acrylic blank increased, the total pressure was proportionately increased to maintain a relatively constant pressure of 40 p.s.i. on the acrylic blank.

After 2 minutes, a compression stretched acrylic sheet was produced having dimensions of 21 in. x 21 in. x 0.258 in. Cooling of the stretched acrylic sheet was started immediately by circulating water through channels in the press platens. After twenty minutes, the stretched acrylic sheet had cooled at a substantially uniform cooling rate to about 110° F. The pressure on the stretched acrylic sheet was released and the acrylic sheet was removed from the press.

As compared to acrylic plastic stretched by prior art methods, the resulting compression stretched acrylic sheet exhibited improved abrasion resistance and resistance to chemical attack and had excellent optical characteristics.

Improved acrylic sheets are produced by this invention even though stretching by this invention involves substantially changing the dimensions of an acrylic blank to produce the stretched acrylic sheet. That is, although substantial changes are produced in the dimensions of an acrylic blank when stretched by the method of this invention, the acrylic blanks are compressed in a way such that relatively uniform movement and flow of the acrylic plastic results. This, in turn, results in the production of stretched acrylic sheets which have improved and substantially uniform properties. Examples of substantial changes in the dimensions of an acrylic blank are given in Examples I and III. However, even larger changes can be made in the dimensions of an acrylic blank while producing a stretched sheet having the improved characteristics described herein.

It will be apparent that various modifications can be made in the method of this invention without departing from the spirit of this invention as described. Thus, advantageous results may be obtained by stretching acrylic plastic by the method of this invention where the acrylic plastic is extruded or is laminated as-cast or laminated extruded. Therefore, this invention is limited only by the scope of the appended claims.

I claim:
1. A method for compression stretching large sheets of acrylic materials comprising:
   heating an acrylic plastic sheet having a single side surface area of at least 24 square inches to a temperature within the softening temperature range of said acrylic sheet;
   compressing said heated acrylic sheet between a pair of heated polished elements, having a thin film of lubricant coated thereon, maintaining said elements in said heated state while compressing at a pressure sufficient to produce a lateral flow rate of said heated acrylic sheet between about 0.1 in./minute and about 72 in./minute to produce substantially uniform flow of the acrylic material without cracking of said sheet and for a period of time sufficient to increase the length or width by at least 60%;
   cooling the resulting stretched acrylic sheet at a predetermined rate to prevent cracking of said stretched acrylic sheet to a temperature below the minimum softening temperature of said acrylic sheet while applying said pressure on said acrylic sheet; and
   releasing said pressure after said stretched acrylic sheet has attained a temperature below said minimum softening temperature, whereby stretched acrylic sheet is produced which has improved optical and physical properties.

2. The method of claim 1 wherein the acrylic material is a resinous polymer of methyl methacrylate.

3. The method of claim 1 wherein said softening temperature range is between about 250° F. and 350° F.

4. The method of claim 1 wherein said acrylic material is cooled at a rate between about 1° F./minute and about 20° F./minute in the softening temperature range.

5. The method of claim 1 wherein said polished plates are selected from the group consisting of steel, glass and aluminum.

6. A method for compression stretching large sheets of acrylic material, comprising:
   heating an as-cast acrylic blank having a single side surface area of at least 24 square inches to a temperature between about 250° F. and about 330° F. for a time sufficient to produce a substantially isothermal acrylic blank;
   compressing said heated acrylic blank between a pair of heated polished elements having a thin film of lubricant coated thereon at a pressure sufficient to produce a lateral flow rate of said heated acrylic blank between about 0.1 in./minute and about 72 in./minute to produce substantially uniform flow of the acrylic material without cracking to produce stretched acrylic sheet for a period of time sufficient to increase the length or width by at least 60%;
   cooling said stretched acrylic sheet to a temperature below about 250° F. at a rate between about 1° F./minute and 20° F./minute; and
   releasing said pressure on said stretched acrylic sheet after said temperature of said stretched acrylic sheet has been reduced below about 250° F.

7. The method of claim 6 wherein said lubricant is selected from the group consisting of silicone-based and petroleum-based lubricants.

8. The method of claim 6 wherein said lubricant is polytetrafluoroethylene.

9. The method of claim 6 wherein said film of lubricant has a thickness less than about 0.0005 in.

10. The method of claim 6 wherein said polished elements are selected from the group consisting of steel, glass and aluminum elements.

11. The method of claim 6 wherein said acrylic material is a resinous polymer of methyl methacrylate.

12. The method of claim 6 wherein said acrylic blank is one of the group consisting of as-cast acrylic, extruded acrylic, laminated as-cast acrylic and laminated extruded acrylic.

13. A method for compression stretching large sheets of acrylic materials, comprising:
   heating an as-cast acrylic blank having a single side surface area of at least 144 square inches to a temperature between about 250° F. and about 330° F. for a time sufficient to produce a substantially isothermal acrylic blank;
   pressing said heated acrylic blank between a pair of heated polished elements in a press, the contacting surfaces of said acrylic blank and said polished elements having a thin film of lubricant therebetween, said pressing continuing at a thickness reduction rate sufficient to produce a lateral flow rate of said acrylic blank between about 5 in./minute and about 10 in./minute until the length or width is increased by at least 60%;
   cooling said stretched sheet to a temperature below about 250° F. at a rate between about 3° F./minute and about 14° F./minute; and
   releasing said pressure on said stretched acrylic sheet after the temperature of said stretched acrylic sheet has been reduced below about 250° F.

14. The method of claim 13 wherein the platens of said press and said polished elements are heated to a temperature substantially equal to said temperature of said heated acrylic blank before pressing said acrylic blank.

15. The method of claim 13 wherein said lubricant is polytetrafluoroethylene.

16. The method of claim 13 wherein said film of said lubricant is less than about 0.0005 in. thick.

17. Acrylic sheet stretched by the method of claim 1.
18. Acrylic sheet stretched by the method of claim 6.
19. Acrylic sheet stretched by the method of claim 13.

References Cited
UNITED STATES PATENTS

| | | | |
|---|---|---|---|
| 2,166,215 | 7/1939 | Lloyd | 264—1 |
| 2,230,118 | 1/1941 | Moulton | 264—1 |
| 2,304,663 | 12/1942 | Smith et al. | 264—1 |
| 2,319,014 | 5/1943 | Smith | 264—1 |
| 2,332,674 | 10/1943 | Smith | 264—1 |
| 3,106,487 | 10/1963 | Frost | 264—338 |
| 3,142,715 | 7/1964 | Burk | 264—338 |
| 3,176,058 | 3/1965 | Mittman | 264—338 |

JULIUS FROME, Primary Examiner

A. H. KOECKERT, Assistant Examiner

U.S. Cl. X.R.

161—165; 264—291